United States Patent [19]

Schwindt et al.

[11] 4,146,688
[45] Mar. 27, 1979

[54] PROCESS FOR MAKING POLYURETHANE RESINS VIA THIO-GROUP CONTAINING DIAMINES

[75] Inventors: Jurgen Schwindt; Gerhard Grogler, both of Leverkusen; Paul Uhrhan, Cologne, all of Fed. Rep. of Germany

[73] Assignee: Bayer Aktiengesellschaft, Leverkusen, Fed. Rep. of Germany

[21] Appl. No.: 826,496

[22] Filed: Aug. 22, 1977

[30] Foreign Application Priority Data

Aug. 27, 1976 [DE] Fed. Rep. of Germany ....... 2638760

[51] Int. Cl.$^2$ ...................... C08G 18/14; C08G 18/38; C08G 18/10
[52] U.S. Cl. ............................. 521/159; 260/18 TN; 260/45.9 AD; 260/553 A; 260/558 S; 260/570 D; 260/571; 260/578; 521/3; 521/164; 528/46; 528/53; 528/64; 560/13; 560/18
[58] Field of Search ............... 260/2.5 AM, 45.9 AD, 260/77.5 AM, 75 NH; 521/159, 164; 528/64

[56] References Cited

U.S. PATENT DOCUMENTS

| | | | |
|---|---|---|---|
| 3,194,793 | 7/1965 | Kogon | 260/2.5 AM |
| 3,375,264 | 3/1968 | Sayigh et al. | 260/453 |
| 3,580,869 | 5/1971 | Rhodes et al. | 260/2.5 AM |
| 3,905,944 | 9/1975 | Finelli | 260/2.5 AM |
| 3,933,692 | 1/1976 | Kushlefsky | 260/77.5 AM |
| 4,017,464 | 4/1977 | Kimball | 260/77.5 AM |
| 4,031,049 | 6/1977 | Hirosawa | 260/2.5 AM |

FOREIGN PATENT DOCUMENTS 44-23111  1969  Japan.

*Primary Examiner*—H.S. Cockeram
*Attorney, Agent, or Firm*—Gene Harsh; Joseph C. Gil; R. Brent Olson

[57] ABSTRACT

This invention relates to new polyurethane resins produced by a process in which aromatic diamines containing thio-groups are used as chain-lengthening agents.

8 Claims, No Drawings

PROCESS FOR MAKING POLYURETHANE RESINS VIA THIO-GROUP CONTAINING DIAMINES

The use of aromatic diamines as chain-lengthening agents in the production of polyurethanes is known. In order to provide sufficient time for working-up, the reactive aromatic isocyanates usually used in technical processes are preferably reacted with slowly-reacting diamines. Diamines of this type which have proved to be particularly suitable are aromatic diamines in which the basicity and hence also the reactivity with isocyanates has been reduced by the introduction of halogen or carboxy substituents. The most commonly used, 3,3'-dichloro-4,4'-diaminodiphenylmethane (MOCA), is an example of such an amine. The main disadvantage of this compound, however, is its toxicity.

In U.S. Pat. No. 3,823,833, it has been proposed to use 2,2'- or 4,4'-diaminodiphenylsulphide as a chain-lengthening agent in the production of polyurethane systems. One disadvantage of these compounds lies in the tendency of the S-S group in the polyurethane segment to be split by reduction or oxidation. Other disadvantages lie in the short pot-life and long molding times required in reactions with polyisocyanates, which render processing uneconomical.

A concentrated polyurethane solution which may be used for the manufacture of fibers, films or artificial leather has been described in published Japanese Patent Application 9195/70. The chain-lengthening agent used in this case is a diamine corresponding to the following general formula: $NH_2$-R-$(SR)_n$-$NH_2$, wherein R represents an aliphatic, aromatic, alicyclic or heterocyclic group and n represents 1 or 2. The main disadvantage of a system which is chain-lengthened with diamines of this type is that it requires the use of an organic solvent because of the excessively high reactivity of the amino groups with isocyanates. This considerably increases the costs, necessitates specialized suction devices and entails the risk of fire and explosion.

In U.S. Pat. No. 3,920,617, it is proposed to use sulphur-containing polyamines corresponding to the following general formula:

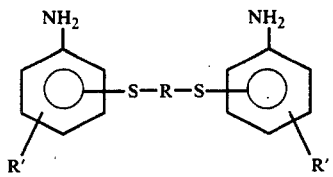

as chain-lengthening agents for the production of polyurethane elastomers. This type of compound provides a sufficiently long time for processing at temperatures of from 25° to 60° C. However, due to the high viscosity of isocyanate prepolymers at these temperatures, the elastomer products obtained are inadequately cross-linked and are inhomogeneous. Although homogeneous elastomers can be obtained at processing temperatures of from 80° to 110° C., the pot-life at these temperatures is only slightly longer than that of MOCA so that no substantial improvement in the processing conditions is obtained compared with the conditions obtained when using the aromatic diamines known in the art.

It is therefore an object of the present invention to obviate the above-described disadvantages of the known aromatic diamine chain-lengthening agents, such as their toxicity and ease of removal of the S-S group by reduction or oxidation, and the disadvantages of the polyurethane elastomers obtained when using such chain-lengthening agents. It is an additional object to provide polyurethane reactive systems which have the advantage of being able to be processed without solvents and of having a relatively longer pot-life and relatively shorter molding time.

DESCRIPTION OF THE INVENTION

The present invention therefore relates to polyurethane resins, including cellular polyurethane resins, based on polyisocyanates, higher molecular weight polyhydroxyl compounds and optionally also low molecular weight polyhydroxyl compounds, and aromatic diamines containing sulphur, which polyurethane resins are characterized in that they contain structural units corresponding to the following general formulae:

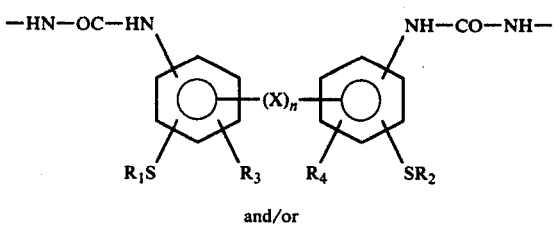

and/or

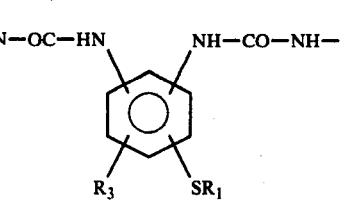

and/or

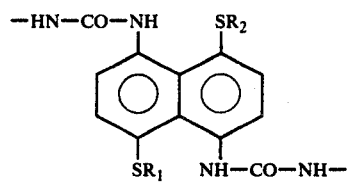

wherein
n — represents 0 or 1;
X — represents one of the following divalent groups:

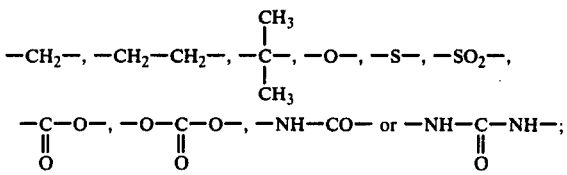

$R_3$ and $R_4$, which may be the same or different, each represent a hydrogen atom; an alkyl group which may be branched and which has from 1 to 6 carbon atoms which may be branched (preferably a methyl group); an aryl group having from 6 to 15, and preferably from 6 to 10, carbon atoms; a cycloalkyl group having from 4 to 12 carbon atoms and preferably from 6 to 9, carbon atoms; halogen; $NO_2$; —CN;

—OR$_5$; or, a group corresponding to the following general formula:

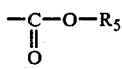

wherein
R$_5$ represents an alkyl group having from 1 to 6 carbon atoms which may be branched;
and
R$_1$ and R$_2$, which may be the same or different, each represent a hydrogen atom; a straight- or branched-chain alkyl group having from 1 to 6 carbon atoms, and preferably a methyl group; an aryl group having from 6 to 15, preferably from 6 to 10 carbon atoms; a cycloalkyl group having from 4 to 12, and preferably from 6 to 9, carbon atoms; or, an acyl group corresponding to the following general formula:

wherein
Y represents oxygen or sulphur; and
R$_6$ represents a straight- or branched-chain alkyl group having from 1 to 6 carbon atoms or an aryl group having from 6 to 10 carbon atoms.

Products in which the urea group is in the ortho- or meta-position, most preferably in the ortho-position, to the sulphur atom are preferred according to the present invention.

The present invention also relates to a process for the production of polyurethane resins, including cellular polyurethane resins, by the reaction of polyisocyanates and compounds containing at least two active hydrogen atoms and having molecular weights of from 400 to 10,000 and optionally low molecular weight polyhydroxyl compounds with aromatic diamines as chain-lengthening agents, optionally in the presence of catalysts, blowing agents and other known additives, which process is characterized in that the diamines used correspond to one of the following general formulae:

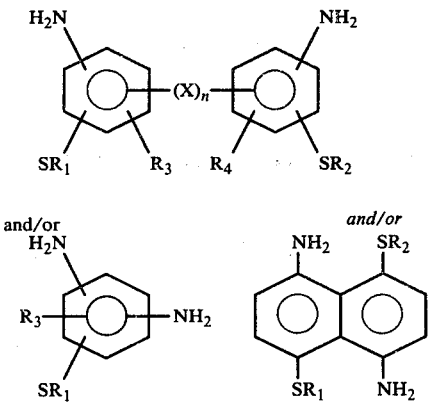

wherein
n, X, R$_1$, R$_2$, R$_3$ and R$_4$ are as defined above.

It has surprisingly been found that, in particular, aromatic diamines, in which the mercapto, thioalkyl, thioaryl and/or thioacyl groups are in the o,o'-position to the amino groups, may be used in casting elastomer systems and foaming processes without the addition of organic solvents and provide excellent processing conditions (sufficiently long pot-life and exceptionally short molding time) both in the production of elastomers and in foaming processes. The exceptionally rapid solidification and hence short time required for keeping the castings in the molds provides for a more rapid operating cycle than is possible when the known amines are used. This is extremely important for the commercial production of polyurethane elastomers.

Other important advantages of the chain-lengthening agents to be used according to the present invention include their easy accessibility and the fact that they are liquid at room temperature or have a relatively low boiling point, a factor which greatly simplifies the use thereof since it obviates the need to melt the diamines before they are added to the reaction mixture and hence provides an additional saving in energy costs. Diamines in which both amino groups are in the ortho-position to the mercapto or thio group are preferred according to the present invention. Diamines wherein R$_3$ and R$_4$ represent H, —OCH$_3$, —OC$_2$H$_5$, Cl or —OCOR$_5$ (wherein R$_5$ represents C$_1$-C$_6$ alkyl) and, in particular, hydrogen are also preferred.

Particularly preferred for the purposes of the present invention are polyurethanes which have recurrent structural units corresponding to the following general formulae:

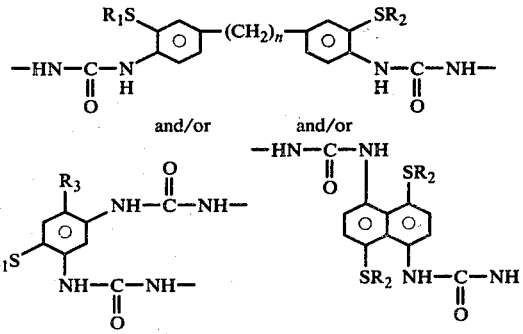

wherein
n, R$_1$, R$_2$ and R$_3$ are as defined above.

In many cases, it is also particularly preferred to include diamines which contain free mercapto groups (R$_1$, R$_3$ represent H) in addition to diamines which contain thioether groups (R$_1$, R$_2$ represent alkyl, preferably —CH$_3$). The mercapto group-containing diamine is generally used in quantities of from 1 to 90%, preferably from 1 to 40% (based on the total quantity of chain-lengthening agent). The free mercapto groups in the polyurethane elastomers may be cross-linked using peroxides, such as di-t-butyl peroxide, or using salts, such as ZnCl$_2$, CdCl$_2$ or PbCl$_2$, during the stage of tempering or they may be cross-linked subsequently by means of atmospheric oxygen with formation of intermolecular disulphide bridges or by salt formation. The mechanism of this intermolecular oxidative disulphide linkage or salt linkage corresponds to that of the vulcanization of rubber with thiuram disulphide compounds and/or sulphur.

This controlled cross-linking of the hard segments in the polyurethane urea substantially improves the mechanical properties of the synthetic resin, in particular the pressure deformation residue, permanent elongation, hardness and abrasion resistance. This is of major importance, particularly for the manufacture of automobile tires from the elastomers according to the present invention.

Examples of diamines which may be used according to the present invention (and references to exemplary literature in which their preparation has been described) are shown below:

| Structure | Reference |
|---|---|
| $H_2N$–⬡(CH$_3$S)–⬡(SCH$_3$)–$NH_2$ | K. Brand; Chem.Ber. 70, 284 (1937) |
| $H_2N$–⬡(SCH$_3$)–⬡(SCH$_3$)–$NH_2$ | K. Brand; Chem.Ber. 42, 3463 (1909) |
| $H_2N$–⬡(HS)–⬡(SH)–$NH_2$ | German Reichspatent No. 367,346; Friedlander 14,918 |
| $CH_3S$–⬡($H_2N$)–⬡($NH_2$)–$SCH_3$ | H. H. Hodgson and P. F. Holt; J.Chem. Soc. 1937, 37–38 |
| $H_2N$–⬡(S-CH(CH$_3$)$_2$)–⬡(S-CH(CH$_3$)$_2$)–$NH_2$ | |
| $H_2N$–⬡(H$_3$CS)–CH$_2$–⬡(SCH$_3$)–$NH_2$ | |
| $H_2N$–⬡(CH$_3$S-CH(CH$_3$))–CH$_2$–⬡(S-CH(CH$_3$)CH$_3$)–$NH_2$ | |
| $H_2N$–⬡(HS)–CH$_2$–⬡(SH)–$NH_2$ | Japanese Patent 69 23,111 |
| $H_2N$–⬡(CH$_3$, Cl, SH)–$NH_2$ | German Reichspatent 367,346; Friedlander 14,918 |
| ⬡($NH_2$, $NH_2$, S–CH$_3$) | German Offenlegungsschriften 2,219,408 and 2,310,015; French Patents 2,052,901 and 2,063,815 |
| ⬡($NH_2$, $NH_2$, SCH$_3$) | German Patent 1,129,281 | and other compounds corresponding to one of the following general formulae:

$R_1S$–⬡($H_2N$, $R_3$)–(CH$_2$)$_n$–⬡($SR_2$, $R_4$)–$NH_2$ and $R_3$–⬡($NH_2$, $SR_1$, $NH_2$)

wherein n — represents 0 or 1;

$R_1$ and $R_2$ represent one of the groups mentioned above and $R_3$ and $R_4$ represent —CH$_3$, —CN, —OCH$_3$, —Cl or $$-\underset{\underset{O}{\|}}{C}-OR_5.$$

The diamines to be used according to the present invention may be prepared by the following known methods:

(I) Preparation of:

$R_1$–S–⬡($H_2N$)–⬡($NH_2$)–S–$R_1$    K. Brand, Chem.Ber. 72

(a) ⬡($NO_2$, $SR_1$) is reduced to the hydrazobenzene derivative using Zn/NaOH and converted by chemical transposition into the benzidine derivative by means of HCl.

(b) Benzidine is reacted with ammonium thiocyanate and bromine in glacial acetic acid and then saponified using KOH to the mercapto potassium derivative of benzene. This is then converted into the thio-compound by reaction with alkyl, aryl or acyl halides.

(c) Reaction of benzidine with $S_2Cl_2$ in benzene, followed by alkaline hydrolysis and reaction of the potassium mercaptide with alkyl, aryl or acyl halides.

(II) Preparation of:

$H_2N$–⬡(S–$R_1$)–⬡(S–$R_1$)–$NH_2$ starting from

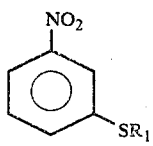

by a method analogous to that of (I) (a).

(III) Preparation of:

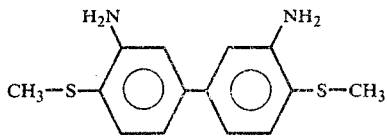

reduction of the dinitro compound with Sn/HCl.

(IV) Preparation of:

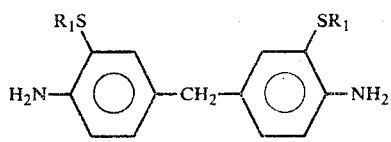

(a) Starting from 4,4'-diaminodiphenylmethane by a method analogous to that of (I) (b).

(b) Reaction of 4,4'-diaminodiphenylmethane with $CS_2 + S_8$ to form the bis-mercapto benzothiazole derivative, followed by hydrolysis using KOH to the bis-mercapto-potassium salt. The potassium salt is then reacted with alkyl, aryl or acyl halides.

(c) Condensation of 2- or 3-aminophenylalkyl sulphides with formaldehyde.

(V) Preparation of:

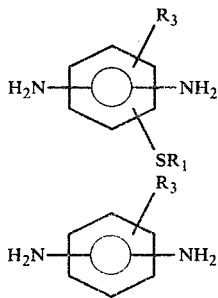

is diacetylated and then sulphochlorinated. The sulphochloride is then reduced by known methods, (e.g. L. Bauer et al., J. Chem. Soc. 1949, 3434). The resulting mercaptan may then be reacted with alkyl, aryl or acyl chloride. Finally, the bis-acetamide is hydrolyzed to the diamine by means of KOH or NaOH.

(VI) Preparation of:

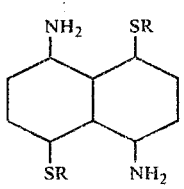

1,5-Diaminonaphthalene is reacted with ammonium thiocyanate and bromine in glacial acetic acid followed by alkaline hydrolysis and etherification of the resulting SH-groups using methyl iodide, dimethylsulphate or isopropyl bromide, etc.

The polyisocyanates used as starting components according to the present invention may be essentially any organic isocyanate including aliphatic, cycloaliphatic, araliphatic, aromatic and heterocyclic polyisocyanates, such as those described, by W. Siefken in Justus Liebigs Annalen der Chemie, 562, pages 75 to 136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixures of these isomers; 1-isocyanato-3,3,5-trimethyl-5-isocyanatomethyl-cyclohexane (German Auslegeschrift No. 1,202,785 and U.S. Pat. No. 3,401,190); hexahydrotolylene-2,4-diisocyanate and -2,6-diisocyanate and mixtures of these isomers; hexahydrophenylene-1,3-diisocyanate and/or 1,4-diisocyanate; perhydrodiphenylmethane-2,4'-diisocyanate and/or 4,4'-diisocyanate; phenylene-1,3-diisocyanate and -1,4-diisocyanate; tolylene-2,4-diisocyanate and -2,6-diisocyanate and mixtures of these isomers; diphenylmethane-2,4'-diisocyanate and/or 4,4'-diisocyanate; naphthylene-1,5-diisocyanate; triphenylmethane-4,4',4''-triisocyanate; polyphenyl-polymethylene polyisocyanates which may be obtained by aniline-formaldehyde condensation followed by phosgenation and which have been described, for example, in British Pat. Nos. 874,430 and 848,671; m and p-isocyanatophenylsulphonyl isocyanates as described in U.S. Pat. No. 3,454,606; perchlorinated aryl polyisocyanates, such as those described, for example, in U.S. Pat. No. 3,277,138; polyisocyanates having carbodiimide groups as described in U.S. Pat. No. 3,152,162; diisocyanates of the type described in U.S. Pat. No. 3,492,330; polyisocyanates containing allophanate groups as described in British Pat. No. 994,890, in Belgian Pat. No. 761,626 and in published Dutch Patent Application No. 7,102,524; polyisocyanates containing isocyanurate groups as described in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups as described in Belgian Pat. No. 752,261 or in U.S. Pat. No. 3,394,164; polyisocyanates containing acylated urea groups as described in German Pat. No. 1,230,778; polyisocyanates containing biuret groups as described in U.S. Pat. Nos. 3,124,605 and 3,201,372 and in British Pat. No. 889,050; polyisocyanates prepared by telomerization reactions as described in U.S. Pat. No. 3,654,106; polyisocyanates having ester groups, such as those described in British Pat. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid groups as described in U.S. Pat. No. 3,455,883.

The distillation residues obtained from the commercial production of isocyanates which contain isocyanate groups may also be used, optionally as solutions in one or more of the above-mentioned polyisocyanates. Mixtures of any of the above-mentioned polyisocyanates may also be used.

As a general rule, it is preferred to use readily available polyisocyanates, such as tolylene-2,4-diisocyanate and -2,6-diisocyanate and mixtures of these isomers ("TDI"); polyphenyl-polymethylene polyisocyanates of the type which may be prepared by aniline/formaldehyde condensation followed by phosgenation ("Crude MDI"); and polyisocyanates containing carbodiimide groups, urethane groups, allophanate groups, isocyanurate groups, urea groups or biuret groups ("modified polyisocyanates").

The starting components used according to the present invention also include compounds, generally having a molecular weight of from 400 to 10,000, which have at least two hydrogen atoms capable of reacting with isocyanates. These compounds may contain amino groups, thiol groups or carboxyl groups, but are preferably polyhydroxyl compounds, and in particular compounds having from 2 to 8 hydroxyl groups with molecular weights of from 800 to 10,000, and preferably from 1,000 to 6,000. Suitable hydroxyl groups containing materials include polyesters, polyethers, polythioethers, polyacetals, polycarbonates and polyester amides having at least 2, generally from 2 to 8, but preferably from 2 to 4 hydroxyl groups, of the type generally known and used for the production of both homogeneous and cellular polyurethanes.

Suitable polyesters containing hydroxyl groups include, e.g. reaction products of polyhydric (preferably dihydric) alcohols, optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or may be unsaturated. The following are mentioned as examples: succinic acid; adipic acid; suberic acid; azelaic acid; sebacic acid, phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids, such as oleic acid; optionally mixed with monomeric fatty acids, dimethyl terephthalate and terephthalic acid-bis-glycol esters. The following are examples of suitable polyhydric alcohols: ethylene glycol; propylene glycol-(1,2) and -(1,3); butylene glycol-(1,4) and -(2,3); hexanediol-(1,6); octanediol-(1,8); neopentyl glycol; cyclohexanedimethanol (1,4-bis-hydroxymethylcyclohexane); 2-methyl-1,3-propanediol; glycerol; trimethylolpropane; hexanetriol-(1,2,5); butanetriol-(1,2,4); trimethylolethane; pentaerythritol; quinitol; mannitol; sorbitol; methyl glycoside; diethylene glycol; triethylene glycol; tetraethylene glycol; polyethylene glycols; dipropylene glycol; polypropylene glycols; dibutylene glycol; and polybutylene glycols. The polyesters may also contain a proportion of carboxyl end groups. Polyesters of lactones, such as ε-caprolactone, or hydroxycarboxylic acids, such as ω-hydroxycaproic acid, may also be used.

The polyethers useable according to the present invention which have at least 2, generally from 2 to 8, preferably 2 or 3, hydroxyl groups are also generally known in the art. They may be prepared, for example, by the polymerization of epoxides, such as ethylene oxide, propylene oxide, butylene oxide, tetrahydrofuran, styrene oxide or epichlorohydrin, either by itself, e.g. in the presence of $BF_3$, or by addition of these epoxides, optionally as mixtures or successively, to starting components having reactive hydrogen atoms, such as water, ammonia, alcohols or amines. Suitable alcohols and amines include ethylene glycol, propylene glycol-(1,3) or -(1,2), trimethylolpropane, 4,4'-dihydroxydiphenylpropane, aniline, ammonia, ethanolamine, ethylene diamine, and the like. Sucrose polyethers may also be used according to the present invention and are described in German Auslegeschriften Nos. 1,176,358 and 1,064,938. It is in many cases preferred to use polyethers which contain predominant amounts of primary OH groups (up to 90%, by weight, based on all the OH groups present in the polyether). Polyethers modified with vinyl polymers, e.g. the compounds obtained by polymerization of styrene or acrylonitrile in the presence of polyethers (U.S. Pat. Nos. 3,383,351, 3,304,273, 3,523,093 and 3,110,695, and German Pat. No. 1,152,536) are also suitable, as well as polybutadienes which have OH groups.

Particularly to be mentioned among the polythioethers useful in the instant invention are the condensation products obtained by reacting thiodiglycol alone and/or with other glycols, dicarboxylic acids, formaldehyde, aminocarboxylic acids or amino alcohols. The products obtained are polythio mixed ethers, polythio ether esters or polythio ether ester amides, depending on the co-components.

Suitable polyacetals include, for example, the compounds which may be prepared from glycols, such as diethylene glycol, triethylene glycol, 4,4'-dioxethoxydiphenyl dimethylmethane or hexanediol, and formaldehyde. Suitable polyacetals for the purposes of the present invention may also be prepared by the polymerization of cyclic acetals.

The polycarbonates containing hydroxyl groups useful are known type and may be prepared by the reaction of diols, such as propanediol-(1,3), butanediol-(1,4) and/or hexanediol-(1,6), diethylene glycol, triethylene glycol or tetraethylene glycol, with diarylcarbonates, e.g. diphenylcarbonate, or with phosgene.

Suitable polyester amides and polyamides include, for example, the predominantly linear condensates prepared from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and modified or unmodified natural polyols, such as castor oil, carbohydrates or starch may also be used. Addition products of alkylene oxides and phenolformaldehyde resins or of alkylene oxides and ureaformaldehyde resins are also suitable for the purposes of the present invention.

Mixtures of the above-mentioned compounds which contain at least two hydrogen atoms capable of reacting with isocyanates and have molecular weights of from 400 to 10,000 may, of course, also be used (for example mixtures of polyethers and polyesters).

Representatives of the various active hydrogen containing materials which may be used according to the present invention are known and have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, pages 45 to 71.

The starting components used according to the present invention may also include compounds having a molecular weight of from 32 to 400 which have at least two hydrogen atoms capable of reaction with isocyanates. These may also be compounds containing hydroxyl groups and/or amino groups and/or thiol groups and/or carboxyl groups, and preferably hydroxyl groups. They generally have from 2 to 8 hydrogen atoms capable of reacting with isocyanates, and preferably 2 or 3 such hydrogen atoms.

The following are examples of such compounds: ethylene glycol; propylene glycol-(1,2) and -(1,3); butylene glycol-(1,4) and -(2,3); pentanediol-(1,5); hexanediol-(1,6); octanediol-(1,8); neopentyl glycol; 1,4-bis-hydroxymethylcyclohexane; 2-methyl-1,3-propanediol; glycerol; trimethylol propane; hexanetriol-(1,2,6); trimethylolethane; pentaerythritol; quinitol; mannitol; sorbitol, diethylene glycol; triethylene glycol; tetraethylene glycol; tetraethylene glycol; polyethylene glycols having a molecular weight of up to 400; dipropylene glycol; polypropylene glycols having a molecular weight of up to 400; dibutylene glycol; polybutylene glycols having a molecular weight of up to 400; 4,4'-dihydroxy-diphenyl propane; dihydroxymethyl-hydroquinone; ethanolamine; diethanolamine; and triethanolamine. In this case, again there may be used mixtures of various compounds having a molecular weight of from 32 to 400 and containing at least two hydrogen atoms capable of reacting with isocyanates.

If in addition to the diamines used according to the invention other chain extending agents, e.g. the compounds mentioned above or additional aliphatic or aromatic diamines are used, the molar proportion of the amine according to the present invention in the total amount of chain-lengthening agent should be at least 0.5, preferably from 1 to 0.8.

Polyhydroxyl compounds in which high molecular weight polyadducts or polycondensates are contained in a finely dispersed or dissolved form may also be used according to the present invention. These modified polyhydroxyl compounds are obtained when polyaddition reactions (e.g. reactions between polyisocyanates and amino functional compounds) or polycondensation reactions (e.g. between formaldehyde and phenols and/or amines) are reacted in situ in the above-mentioned hydroxyl compounds. Processes of this type are known and have been described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. Modified polyhydroxyl compounds of this type may also be prepared by mixing an aqueous polymer dispersion with a polyhydroxyl compound and then removing water from the mixture as described in U.S. Pat. No. 3,869,413 and German Offenlegungsschrift No. 2,550,860. When such modified polyhydroxyl compounds are used as starting components in the polyisocyanate polyaddition process, polyurethane resins having substantially improved mechanical properties are, in many cases, obtained.

If polyurethane foams are to be produced by the process according to the present invention, water and/or readily volatile organic substances are used as blowing agents. Suitable organic blowing agents include, for example, acetone; ethyl acetate; halogen-substituted alkanes, such as methylene chloride, chloroform, ethylidene chloride, vinylidene chloride, monofluorotrichloromethane, chlorodifluoromethane and dichlorodifluoromethane; butane; hexane; heptane; diethyl ether; and the like. The effect of a blowing agent may also be obtained by the addition of compounds which decompose at temperatures above room temperature to release gases, for example nitrogen. Further examples of blowing agents and the use of blowing agents are known and have been described in Kunststoff-Handbuch, Volume VII, published by Vieweg and Höchtlen, Carl-Hanser-Verlag, Munich 1966, pages 108 and 109, 453 to 455 and 507 to 510.

Catalysts are also frequently used according to the present invention. The catalysts added are generally known and include tertiary amines, such as triethylamine, tributylamine, N-methylmorpholine, N-ethylmorpholine, N-cocomorpholine, N,N,N',N'-tetramethylethylenediamine, 1,4-diazabicyclo-(2,2,2)-octane, N-methyl-N'-dimethylaminoethyl-piperazine, N,N-dimethylbenzylamine, bis-(N,N-diethylaminoethyl)-adipate, N,N-diethylbenzylamine, pentamethyldiethylenetriamine, N,N - dimethylcyclohexylamine, N,N,N',N'-tetramethyl-1,3-butanediamine, N,N-dimethyl-β-phenylethylamine, 1,2-dimethylimidazole and 2-methylimidazole. Known Mannich bases obtained from secondary amines, such as dimethylamine, and aldehydes, preferably formaldehyde, or ketones, such as acetone, methyl ethyl ketone or cyclohexanone, and phenols, such as phenol, nonylphenol or bisphenol, may also be used as catalysts.

Catalysts which consist of tertiary amines having hydrogen atoms which are reactive with isocyanate groups may also be used and include triethanolamine, triisopropanolamine, N-methyl-diethanolamine, N-ethyl-diethanolamine, N,N-dimethyl-ethanolamine and the reaction products thereof with alkylene oxides, such as propylene oxide and/or ethylene oxide.

Silaamines having carbon-silicon bonds as described in U.S. Pat. No. 3,620,984 may also be used as catalysts. Examples include 2,2,4-trimethyl-2-silamorpholine or 1,3-diethylaminomethyl-tetramethyl-disiloxane.

Basic nitrogen compounds, such as tetraalkylammonium hydroxides, alkali metal hydroxides, such as sodium hydroxide, alkali metal phenolates, such as sodium phenolate, and alkali metal alcoholates, such as sodium methylate, may also be used as catalysts. Hexahydrotriazines are also suitable catalysts.

Organic metal compounds may also be used as catalysts according to the present invention. In particular, organic tin compounds may be used. The organic tin compounds used include tin(II) salts of carboxylic acids, such as tin(II) acetate, tin(II) octoate, tin(II) ethyl hexoate and tin(II) laurate, and tin(IV) compounds, such as dibutyl tin oxide, dibutyl tin dichloride, dibutyl tin diacetate, dibutyl tin dilaurate, dibutyl tin maleate or dioctyl tin diacetate.

All the above-mentioned catalysts may, of course be used as mixtures.

Further examples of catalysts which may be used according to the present invention and details concerning the activity of the catalysts are known and are described, e.g. in Kunststoff-Handbuch, Volume VII, published by Vieweg and Höchtlen, Carl-Hanser-Verlag, Munich 1966, pages 96 to 102.

The catalysts, when used, are generally used in a quantity of from about 0.001 to 10%, by weight, based on the total reaction mixture.

Surface active additives, such as emulsifiers and foam stabilizers, may also be used according to the present invention. Suitable emulsifiers include, e.g. the sodium salts of ricinoleic sulphonate, or salts of fatty acids with amines, such as oleic acid diethylamine or stearic acid diethanolamine. Alkali metal or ammonium salts of sulphonic acids, such as dodecylbenzenesulphonic acid or dinaphthylmethane disulphonic acid, or of fatty acids, such as ricinoleic acid, or of polymeric fatty acids, may also be used as surface active additives.

Suitable foam stabilizers are particularly the polyether siloxanes, and especially those which are water-soluble. These compounds generally have a polydimethyl siloxane group attached to a copolymer of ethylene oxide and propylene oxide. Foam stabilizers of this type have been described, for example, in U.S. Pat. Nos. 2,834,748; 2,917,480 and 3,629,308.

Other additives which may also be used according to the present invention include reaction retarders, e.g. substances which are acid in reaction, such as hydrochloric acid or organic acid halides; cell regulators, such as paraffins or fatty alcohols or dimethyl polysiloxanes; pigments; dyes; flame retarding agents, such as tris-chloroethylphosphate, tricresyl phosphate, ammonium phosphate and polyphosphate; stabilizers against ageing and weathering; plasticizers; fungistatic and bacteriostatic substances; and fillers, such as barium sulphate, keiselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the present invention and details concerning the use and mode of action of these additives may be found in Kunststoff-Handbuch, Volume VII, published by Vieweg and Höchtlen, Carl-hanser-Verlag, Munich 1966, pages 103 to 113.

According to the present invention, the components are reacted together by the known one-shot process, prepolymer process or semi-prepolymer process, often using mechanical devices, such as those described in U.S. Pat. Re. No. 24,514. Details concerning processing apparatus which may also be used according to the present invention are known and may be found, e.g. in Kunststoff-Handbuch, Volume VII, published by Vieweg and höchtlen, Carl-Hanser-Verlag, Munich 1966, on pages 121 to 205.

According to the present invention, a foaming reaction for producing foam products is often carried out inside molds. In this process, a foamable reaction mixture is introduced into a mold which may be made of a metal, such as aluminum, or a plastic material, such as an epoxy resin, and it foams inside the mold to produce the shaped product. This process of foaming in molds may be carried out to produce a product having a cellular structure on its surface or it may be carried out to produce a product having a compact skin and cellular core. According to the present invention, the desired result may be obtained by either introducing just sufficient foamable reaction mixture to fill the mold with foam after the reaction or introducing a larger quantity of reaction mixture than is necessary to fill the mold with foam. The second method is known as "overcharging", a procedure which has been disclosed, e.g. in U.S. Pat. Nos. 3,178,490 and 3,182,184.

Release agents generally known in the art as "external mold release agents", such as silicone oils, are frequently used when foaming is carried out inside molds, but the process may also be carried out with the aid of so-called "internal mold release agents", e.g. those disclosed in German Offenlegungsschriften Nos. 2,121,670 and 2,307,589, if desired in combination with external mold release agents.

Cold setting foams may also be produced according to the present invention (see, e.g., British Pat. No. 1,162,517 and German Offenlegungsschrift No. 2,153,086).

Foams may, of course, also be produced by the process of block foaming or by the known laminator process.

The quantities of reactants used in the process according to the present invention are generally adjusted so that the molar ratio of polyisocyanates to chain-lengthening agents plus compounds having reactive OH-groups is from 0.9 to 1.5, depending on the particular procedure employed, preferably from 1.05 to 1.25. If the process is carried out via the prepolymer stage, the percentage isocyanate content in the prepolymer may be from 1 to 6%, by weight. The molar ratio of reactive hydrogen in the chain-lengthening agent to reactive hydroxyl groups may vary within wide limits, but should preferably be from 0.4 to 1.5. The polyurethanes obtained when using such ratios range from soft to rigid.

The process according to the present invention may be carried out by various methods. For example, the compound having a molecular weight of from 400 to 10,000 and containing at least two hydroxyl groups may be reacted with an excess of diisocyanate, the resulting melt being then poured into molds after addition of the chain-lengthening agent. A high quality elastic polyurethane resin is then obtained after several hours further heating.

According to another method, a mixture of the higher molecular weight compound having at least two hydroxyl groups and the chain-lengthening agent is reacted in an excess of diisocyanate and the reaction product is shaped by the application of heat and pressure after it has been granulated. Polyurethane resins of various degrees of rigidity and elasticity may be obtained under these conditions, depending on the proportions in which the reactants are used. Products which may be processed like thermoplasts may also be obtained by this method. According to another method, a mixture of the higher molecular weight compound which contains at least two hydroxyl groups and the chain-lengthening agent used according to the present invention is reacted with less than the equivalent quantity of diisocyanate. A sheet which may be rolled out is obtained under these conditions. This sheet may, for example, subsequently be converted into a rubbery elastic polyurethane resin by cross-linking it with an additional quantity of diisocyanate.

Elastomers produced according to the present invention are versatile in their applications, for example, they may be used for the production of shaped products which are subjected to severe mechanical wear in use, such as rollers or cone belts, or gaskets or seals which are subjected to severe thermal or chemical conditions, or for hot water pipes or motors of for the manufacture of foils and sheets, textile coatings and polyurethane powders.

Chain-lengthening may also be carried out in the presence of the blowing agents and additives described above, preferably inside closed molds. Foams having a cellular core and non-cellular surface may be obtained under these conditions.

The elastic and semi-elastic foams obtainable by the process according to the present invention may be used, for example, as upholstery or padding materials, mattresses or packaging materials and by virtue of their flame resistance they may also be used wherever this property is particularly important, for example, in the construction of automobiles and aircraft and in the transport industry in general. The foams may either be produced by foaming inside molds or they may be manufactured from material which has been foamed in the block.

The following Examples illustrate the present invention. (The figures given represent parts, by weight, or percentages, by weight, unless otherwise indicated.)

(A) Preparation of 3,3'-bis-methylthio derivatives or 3,3'-bis-isopropylthio derivatives of 4,4'-diaminodiphenylmethane Method (a): Bis-(mercaptobenzothiazole)-methane is hydrolyzed using 55% sodium hydroxide solution at 170° C. under pressure (6000 mbar). 4,4'-diamino-3,3'-bis-thiol diphenylmethane thereby obtained is added at room temperature to an alcoholic solution of sodium ethylate and stirred for one hour at from 60° to 70° C. The quantities of methyl iodide and isopropyl bromide required for etherification are added dropwise at from 70° to 80° C. The product is isolated by the addition of hot water, washed three times with hot water, taken up in ether of dioxane and dried over $MgSO_4$. Brown, viscous oils are obtained after removal of dioxane under vacuum.

Method (b): Another method of synthesis involves the condensation of thioanisolidine or 2-isopropylthioaniline with formaldehyde.

Purification of the compounds in the aqueous phase may also be carried out via the hydrochloride stage of the amine followed by neutralization.

The following analytical data were obtained from compounds prepared according to method (a)

| Isopropylthio derivative: | | | |
|---|---|---|---|
| observed: | C: 65.6% | H: 8.0% | S: 18.4% |
| calculated: | C: 65.5% | H: 7.9% | S: 18.0% |
| Methyl thio derivative: | | | |
| observed: | C: 62.5% | H: 6.4% | N: 9.85% | S: 22.4% |
| calculated: | C: 62.0% | H: 6.2% | N: 9.6% | S: 22.0% |

(B) Preparation of 3,3'-bis-methylthio derivatives or 3,3'-bis-isopropylthio derivatives of benzidine Method (a): o-nitrothiophenol is reacted at from 60° to 70° C. with the quantity of methyl iodide and isopropylbromide required for etherification in alcoholic sodium ethylate solution. The o-nitrothioanisole and o-isopropylthio compounds were converted into the hydrazo-derivatives via the stage of the azo-hydroxy and azo-derivative in the presence of Zn/NaOH. The thio-substituted hydrazobenzenes were converted into the corresponding benzidines by chemical rearrangement in an acid medium by known methods.

To this end, a solution of 1 mole of thio-substituted hydrazobenzene is dissolved in 500 ml of diethyl ether and added with coding and stirring at 0° C. to 2000 ml of a 20% aqueous hydrochloric acid. Following the addition of a further 1500 ml concentrated hydrochloric acid the precipitate (thiosubstituted benzidine hydrochloride) is neutralized with aqueous NaOH.

Method (b): The products may also be prepared from benzidine by reaction with ammonium thiocyanate and bromine followed by alkaline hydrolysis and etherification of the resulting SH-groups using methyl iodide, dimethylsulphate or isopropyl bromide. The following analytical data were obtained from compounds prepared according to method (b):

| Methylthio derivative: | | | | |
|---|---|---|---|---|
| observed: | C: 60.7% | H: 5.8% | N: 10.8% | S: 22.8% |
| calculated: | C: 60.8% | H: 5.7% | N: 10.1% | S: 23.2% |
| Isopropylthio derivative: | | | | |
| observed: | C: 64.8% | H: 7.1% | N: 7.85% | S: 19.3% |
| calculated: | C: 65% | H: 7% | N: 8% | S: 19% |

(C) Preparation of (a) 4-methylthio-m-phenylene-diamine (b) 5-methylthio-m-toluidine and (c) 4-methylthio-o-toluidine 1 mol of the appropriately substituted thiophenol is dissolved in alcoholic NaOH (1 mol of NaOH in 250 ml of ethanol) and stirred at from 60° to 78° C. for one hour. 1 mol of methyl iodide is then added dropwise at from 70° to 78° C. and the reaction mixture is stirred for a further half hour at this temperature. The product is cooled to room temperature and filtered from the precipitated sodium iodide. The alcoholic phase is evaporated off and the product is washed and separated off with hot water.

The following analytical data are obtained:
(a) observed: C: 54.67% H: 6.63% N: 17.2% S: 21.4%; calculated: C: 54.55% H: 6.49% N: 18.18% S: 20.78%.
(b) and
(c) observed: C: 57.28% H: 7.05% N: 16.42% S: 19.25%; calculated: C: 57.14% H: 7.14% N: 16.67% S: 19.05%.

EXAMPLES

EXAMPLE 1

100 parts of a prepolymer having an isocyanate content of 3.2%, by weight, prepared from tolylene diisocyanate (80% 2,4- and 20% 2,6-isomer) and a linear polypropylene glycol having a molecular weight of 2,000 and OH number 56 are mixed with 12 parts of liquid 4,4'-diamino-3,3'-bis-(isopropylthio)-diphenylmethane at 30° C. (molar ratio $NCO:NH_2 = 1.10$). The mixture remains pourable for 30 minutes at from 30° to 40° C. It is poured into a mold which has been preheated to 110° C. and is removed from the mold after 5 minutes at this temperature. After 24 hours' tempering at 110° C., an elastomer having the following mechanical properties is obtained:

| Tensile strength | DIN 53504 | 6.1 MPa |
|---|---|---|
| Elongation at break | DIN 53504 | 320% |
| Tear propagation resistance | DIN 53515 | 130 N |
| Shore hardness A | DIN 53505 | 50 |
| Elasticity | DIN 53512 | 33% |

EXAMPLE 2

100 parts of a prepolymer obtained from a polyester of adipic acid and ethylene glycol (OH number 56) and tolylene-2,4-diisocyanate (isocyanate content of prepolymer 3.5%, by weight) are mixed with 12 parts of liquid 4,4'-diamino-3,3'-bis-(isopropylthio)-diphenylmethane at 30° C. ($NCO:NH_2 = 1.10$). The mixture remains in a pourable state for 20 minutes at 30° C. The mixture is poured into a mold and may be removed from the mold after 4 minutes at 110° C. After 24 hours' tempering at 110° C., the product is found to have the following mechanical properties:

| | | |
|---|---|---|
| Tensile strength | DIN 53504 | 17 MPa |
| Elongation at break | DIN 53504 | 640% |
| Tear propagation resistance | DIN 53515 | 255 N |
| Shore hardness | DIN 53505 | 75 |
| Elasticity | DIN 53512 | 31% |

EXAMPLE 3

10.6 parts of liquid 4,4'-diamino-3,3'-bis-(methylthio)-diphenylmethane are added to 100 parts of the prepolymer from Example 2 at 30° C. The mixture is homogenized within 30 seconds and is then poured into a preheated mold. The reactive mixture remains in a pourable state for 10 minutes. When cast into a mold, it may be removed after 4 minutes. After a tempering time of 24 hours at 110° C., it is found to have the following mechanical properties:

| | | |
|---|---|---|
| Tensile strength | DIN 53504 | 24.5 MPa |
| Elongation at break | DIN 53504 | 646% |
| Tear propagation resistance | DIN 53515 | 341 N |
| Shore hardness A | DIN 53505 | 78 |
| Elasticity | DIN 53512 | 33% |

EXAMPLE 4

15.4 parts of liquid 4,4'-diamino-3,3'-bis-(methylthio)-diphenylmethane are added at 30° C. to 100 parts of a prepolymer obtained from dihydroxypolytetrahydrofuran (average molecular weight 1700) and a mixture of 65% of tolylene-2,4-diisocyanate and 35% of tolylene-2,6-diisocyanate (isocyanate content of the prepolymer 4.9%) (NCO:NH$_2$ of reaction mixture = 1.10). The mixture is homogenized within 30 seconds and then poured into a preheated mold. The reactive mixture remains in a pourable state for 7 minutes. When poured into a mold, it may be removed after from 3 to 4 minutes at 110° C. and, after a tempering time of 24 hours at 110° C., it is found to have the following mechanical properties:

| | | |
|---|---|---|
| Tensile strength | DIN 53504 | 27.3 MPa |
| Elongation at break | DIN 53504 | 620% |
| Tear propagation resistance | DIN 53515 | 410 N |
| Shore hardness A | DIN 53505 | 80 |
| Elasticity | DIN 53512 | 47% |

EXAMPLE 5

12.2 parts of 3,3'-bis-isopropylthio-benzidine are added to 100 parts of the prepolymer from Example 2 at 35° C. (NCO:NH$_2$ = 1.10). The mixture is homogenized within 30 seconds and poured into a preheated mold. The reactive mixture remains in a pourable state for 16 minutes. When cast into a mold, it may be removed after 6 minutes at 110° C. After a tempering time of 24 hours at 110° C., it is found to have the following mechanical properties:

| | | |
|---|---|---|
| Tensile strength | DIN 53504 | 18.5 MPa |
| Elongation at break | DIN 53504 | 710% |
| Tear propagation resistance | DIN 53515 | 278 N |
| Shore hardness A | DIN 53505 | 55 |
| Elasticity | DIN 53512 | 33% |

EXAMPLE 6

10.16 parts of 3,3'-bis-methylthiobenzidine are added to 100 parts of the prepolymer from Example 5 at 35° C. The mixture is homogenized within 30 seconds (NCO:NH$_2$ = 1.10). It remains in a pourable state for from 14 to 15 minutes at 30° C. When cast into a mold, it may be removed after 5.5 minutes at 110° C. After a tempering time of 24 hours at 110° C., it is found to have the following mechanical properties:

| | | |
|---|---|---|
| Tensile strength | DIN 53504 | 26.7 MPa |
| Elongation at break | DIN 53504 | 604% |
| Tear propagation resistance | DIN 53515 | 379 N |
| Shore hardness A | DIN 53505 | 78 |
| Elasticity | DIn 53512 | 31% |

EXAMPLE 7

100 parts of the prepolymer from Example 4 are mixed with 14.6 parts of 3,3'-bis-methylthiobenzidine at 35° C. The mixture is homogenized within 30 seconds (NCO:NH$_2$ = 1.10) and poured into a preheated mold. It remains in a pourable state for from 6 to 7 minutes at 35° C. When cast into a mold, it may be removed after 3 minutes at 110° C. After a tempering time of 24 hours at 110° C., it is found to have the following mechanical properties:

| | | |
|---|---|---|
| Tensile strength | DIN 53504 | 27.9 MPa |
| Elongation at break | DIN 53504 | 596% |
| Tear propagation resistance | DIN 53515 | 413 N |
| Shore hardness A | DIN 53505 | 81 |
| Elasticity | DIN 53512 | 45% |

EXAMPLE 8

100 parts of the prepolymer from Example 4 are mixed with 17.6 parts of 3,3'-bis-isopropylthio-benzidine at 35° C. The mixture is homogenized within 30 seconds (NCO:NH$_2$ = 1.10) and poured into a preheated mold. It remains in a pourable state for 8 minutes at 35° C. When cast into a mold, it may be removed after from 2 to 3 minutes at 110° C. and, after a tempering time of 24 hours at 110° C., it is found to have the following mechanical properties:

| | | |
|---|---|---|
| Tensile strength | DIN 53504 | 14.3 MPa |
| Elongation at break | DIN 53504 | 820% |
| Tear propagation resistance | DIN 53515 | 210 N |
| Shore hardness A | DIN 53505 | 65 |
| Elasticity | DIN 53512 | 31% |

EXAMPLE 9

100 parts of the prepolymer from Example 1 are mixed with 5.33 parts of 1,3-diamino-4-methylthiobenzene at 40° C. The mixture is homogenized for 30 seconds and poured into a preheated mold. The reactive mixture remains in a pourable state for 8 minutes at 40° C. When cast in a mold, it may be removed after 1.5 minutes at 110° C. After a tempering time of 24 hours at 110° C., it is found to have the following mechanical properties:

| | | |
|---|---|---|
| Tensile strength | DIN 53504 | 23 MPa |
| Elongation at break | DIN 53504 | 525% |
| Tear propagation resistance | DIN 53515 | 314 N |
| Shore hardness A | DIN 53505 | 81 |

| | | |
|---|---|---|
| Elasticity | DIN 53512 | 50% |

What is claimed is:

1. Polyurethane resins based on polyisocyanates, higher molecular weight and optionally also low molecular weight polyhydroxyl compounds and aromatic diamines containing sulphur, characterized in that they contain structural units corresponding to the following general formulae:

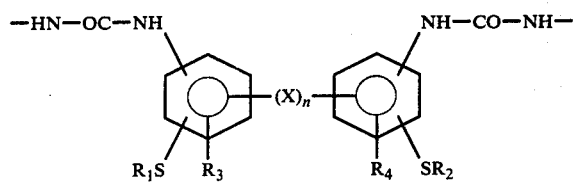

and/or

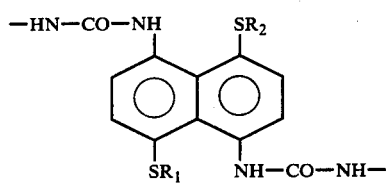

and/or

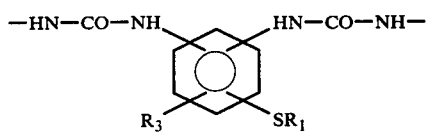

wherein
n represents 0 or 1;
X represents one of the following divalent groups:

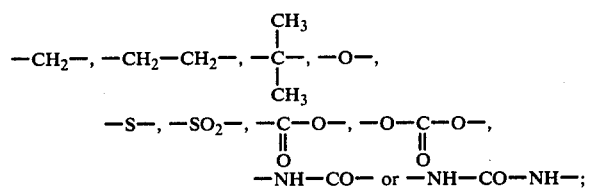

$R_3$ and $R_4$, which may be the same or different, each represents a hydrogen atom; an alkyl group having from 1 to 6 carbon atoms which may be branched; an aryl group having from 6 to 15 carbon atoms; a cycloalkyl group having from 4 to 12 carbon atoms; halogen; $-NO_2$; $-CN$; $-OR_5$; or a group corresponding to the following general formula:

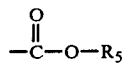

wherein
$R_5$ represents an alkyl group having from 1 to 6 carbon atoms which may be branched;
$R_1$ and $R_2$, which may be the same or different, each represents a hydrogen atom; a straight- or branched-chain alkyl group having from 1 to 6 carbon atoms; an aryl group having from 6 to 15 carbon atoms; a cycloalkyl group having from 4 to 12 carbon atoms; or, an acyl group corresponding to the following general formula:

wherein
Y represents oxygen or sulphur; and
$R_6$ represents a straight- or branched-chain alkyl group having from 1 to 6 carbon atoms or an aryl group having from 6 to 10 carbon atoms.

2. Polyurethane resins according to claim 1 having structural units corresponding to the following general formulae:

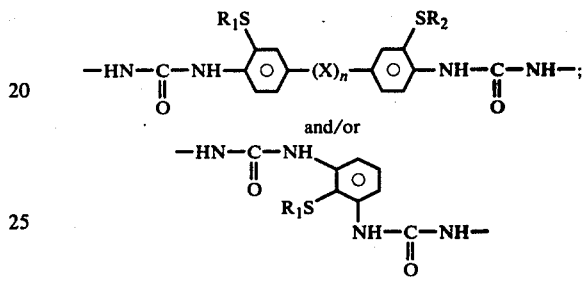

wherein
n, X, $R_1$ and $R_2$ are as defined in claim 1.

3. Polyurethane resins according to claim 1 having structural units corresponding to the following general formulae:

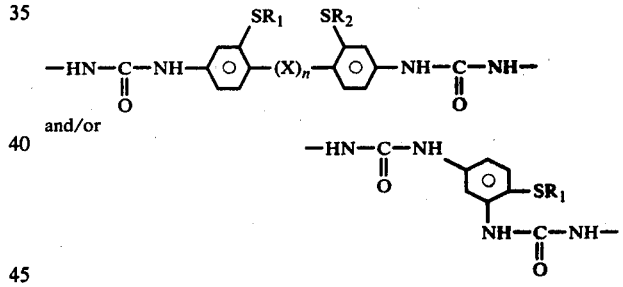

wherein
n, X, $R_1$ and $R_2$ are as defined in claim 1.

4. Polyurethane resins according to claim 1 having structural units corresponding to the following general formulae:

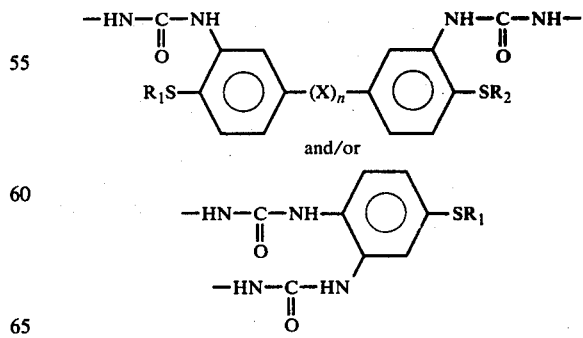

wherein
n, X, $R_1$ and $R_2$ are as defined in claim 1.

5. A process for the production of polyurethane resins, including cellular polyurethane resins, from
  (a) polyisocyanates and
  (b) compounds containing at least two active hydrogen atoms and having a molecular weight of from 400 to 10,000, and
optionally
  (c) low molecular weight polyhydroxyl compounds and
  (d) aromatic diamines used as chain-lengthening agents, characterized in that diamines corresponding to the following general formulae are used:

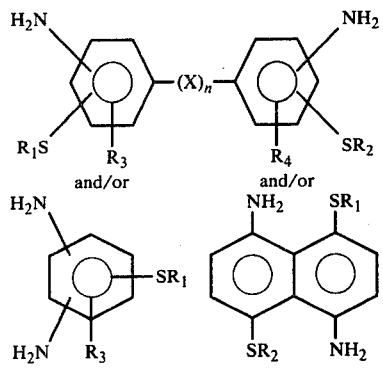

wherein
  n represents 0 or 1;
  X represents one of the following divalent groups:

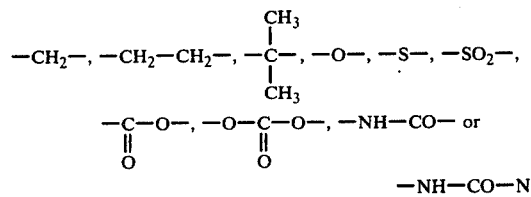
$$-NH-CO-NH-;$$

$R_3$ and $R_4$, which may be the same or different, each represents a hydrogen atom; an alkyl group having from 1 to 6 carbon atoms which may be branched; an aryl group having from 6 to 15 carbon atoms; a cycloalkyl group having from 4 to 12 carbon atoms; halogen; $-NO_2$; $-CN$; $-OR_5$; or a group corresponding to the following general formula:

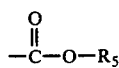

wherein
  $R_1$ and $R_2$, which may be the same or different, each represents a hydrogen atom; a straight- or branched-chain alkyl group having from 1 to 6 carbon atoms; an aryl group having from 6 to 15 carbon atoms; a cycloalkyl group having from 4 to 12 carbon atoms; or, an acyl group corresponding to the following general formula:

6. Process according to claim 5, characterized in that diamines corresponding to the following general formulae are used:

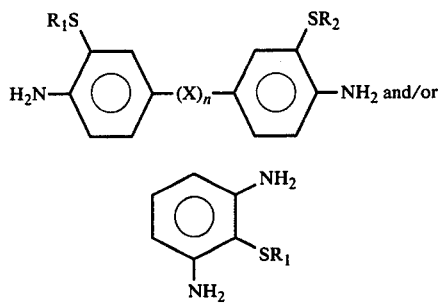

wherein
  X, n, $R_1$, and $R_2$ are as defined in claim 5.

7. Process according to claim 5, characterized in that diamines corresponding to the following general formulae are used:

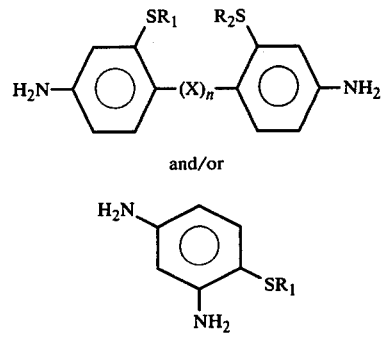

wherein
  X, n, $R_1$, and $R_2$ are as defined in claim 5.

8. Process according to claim 5, characterized in that diamines corresponding to the following general formulae are used:

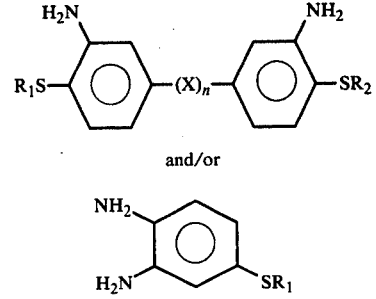

wherein
  X, n, $R_1$ and $R_2$ are as defined in claim 5.

* * * * *